July 26, 1966     F. J. CARSON     3,262,768

METHOD FOR BENDING AND TEMPERING GLASS SHEETS

Filed Jan. 24, 1961

INVENTOR.
Frank J. Carson
BY Hobbe & Swope
ATTORNEYS

United States Patent Office 3,262,768
Patented July 26, 1966

3,262,768
METHOD FOR BENDING AND TEMPERING GLASS SHEETS
Frank J. Carson, Toledo, Ohio, assignor to Libbey-Owens-Ford Glass Company, Toledo, Ohio, a corporation of Ohio
Filed Jan. 24, 1961, Ser. No. 84,613
4 Claims. (Cl. 65—104)

This invention relates broadly to the bending and tempering of sheets of glass. More particularly, the invention has to do with a new and improved method and apparatus for performing the foregoing processes.

Generally stated, present day bending of glass sheets is usually carried out on metal bending molds having shaping surfaces formed thereon to conform to the desired curvatures of the finished sheets. The bending procedure involves first positioning a glass sheet on the mold and then heating the sheet to the bending temperature of the glass whereupon the heated sheet sags by the action of gravity into conformity with the shaping surface of the mold.

When the bent sheets of glass are to be utilized as windows for automobiles and other vehicles or in various other applications which require a relatively high resistance to breakage, it is desirable to temper the glass to improve its mechanical strength. One well-known process of tempering glass includes heating the glass to approximately the softening point followed by rapidly chilling the glass to place the outer surfaces of the sheets under compression and the interiors thereof under tension. This treatment of the sheets not only improves the mechanical strength of the glass but also modifies its breaking characteristics so that when broken, the glass will disintegrate into many small particles which are relatively harmless as compared to the large dangerous pieces which result from breakage from ordinary glass.

In commonly used continuous production type bending and tempering procedures, the sheets are passed directly from the bending to the tempering operations. In this way the heat required to bend a sheet of glass is utilized in tempering the sheet and, in addition, less handling of the sheet is required. In one such procedure, the flat sheets of glass are placed upon the mold in a loading area, are carried by the mold through a bending area wherein the sheets are heated to their softening temperatures permitting them to sag against the shaping surfaces of the mold, and are supported by this mold as they are moved through a tempering area where their temperature is rapidly reduced. Various methods are used to chill the sheets; a more common method being to direct blasts of air against the opposite surfaces of the sheets as they pass through the tempering area.

While the procedure described above lends itself to efficient production methods, one inherent difficulty which has been observed is that a differential of temperature exists between the mold and the areas of glass in contact therewith. The metal mold does not cool off as fast as the glass sheets and during the tempering process this residual heat in the mold is conveyed to the glass contacting the shaping surface. The effect of the mold in the tempering process, therefore, is to result in uneven cooling or chilling of the sheets. To be evenly tempered, the entire outer surface of the glass must be in compression. When the major portion of the sheet cools faster than the areas in contact with the mold, the latter areas are placed under less stress and thus result in a weak spot in the sheet.

When bending molds of a type commonly referred to as "ring molds" are used, the marginal edge portions of the sheets are the only portions which contact the mold and this differential in the rate of cooling does not present a serious problem. However, when the sheets are to be used as side lights in automobiles, one edge thereof, the upper edge, is exposed when the side light is not in its fully raised position. Since glass is materially stronger in compression than in tension, it is desirable to have this exposed edge in compression. If this edge were in tension or reduced compression, any possible blow, scratch or nick could result in destruction of the side light.

It is, therefore, a primary object of this invention to provide an improved method and apparatus for bending and tempering sheets of glass whereby at least one edge portion thereof is also tempered to improve its resistance to breakage.

Another object of the invention is to accomplish the foregoing by removing at least one edge of the sheet from the mold shaping surface at the same time as the sheet is chilled.

Another object of the invention is to provide such an improved method and apparatus for bending and tempering sheets of glass by directing blasts of relatively cool air against the upper and lower surfaces of the bent sheet as said sheet is supported in a substantially horizontal position on the mold, and controlling the pressure of the air blasts against the opposite surfaces of the sheet to create a differential in the rate of cooling of the opposite surfaces to cause warping of the sheet to move at least one edge of said sheet away from and out of contact with the respective shaping surface to allow the passage of cooling air between said sheet edge and said shaping surface.

A further object of the invention is to provide such an improved method and apparatus in which the differential in the rate of cooling of the opposite surfaces of the sheet is caused by retarding the flow of air from beneath the glass sheet to reduce the rate of cooling of the lower surface of said sheet in relation to the upper surface thereof.

Other objects and advantages of the invention will become more apparent during the course of the following description when taken in connection with the accompanying drawings.

In the drawings, wherein like numerals are employed to designate like parts throughout the same:

Figure 1:
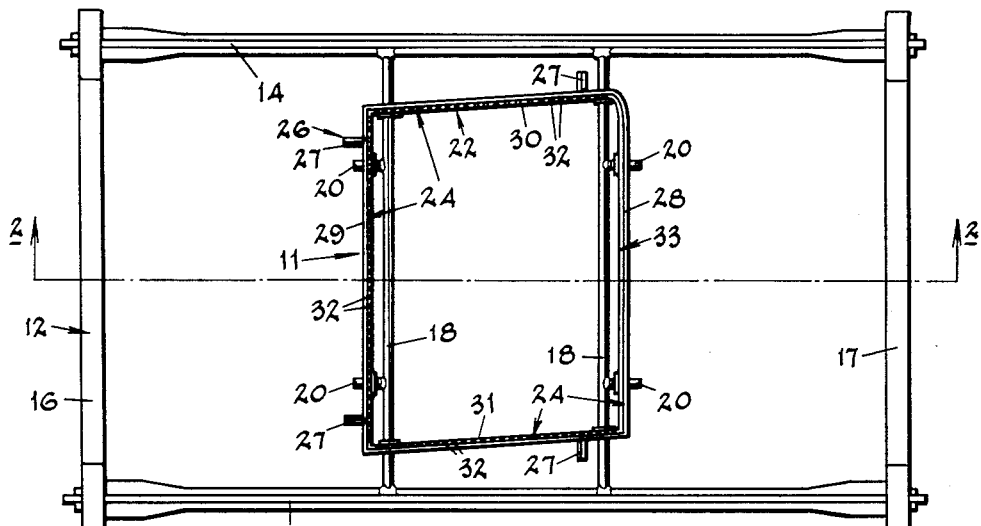
FIG. 1 is a plan view of an apparatus for bending glass sheets embodying the novel features of the present invention.

For the purpose of illustration, in the drawings is shown an apparatus for bending glass sheets 10, which apparatus includes a bending mold 11 of the so-called solid ring type supported on a rack 12 for movement through a bending furnace (not shown) and through blast heads 13 for rapidly chilling the sheets.

Figure 2:
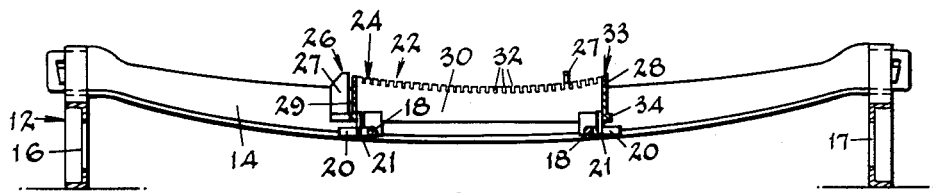
FIG. 2 is a sectional view taken along line 2—2 of FIG. 1.
Figure 3:
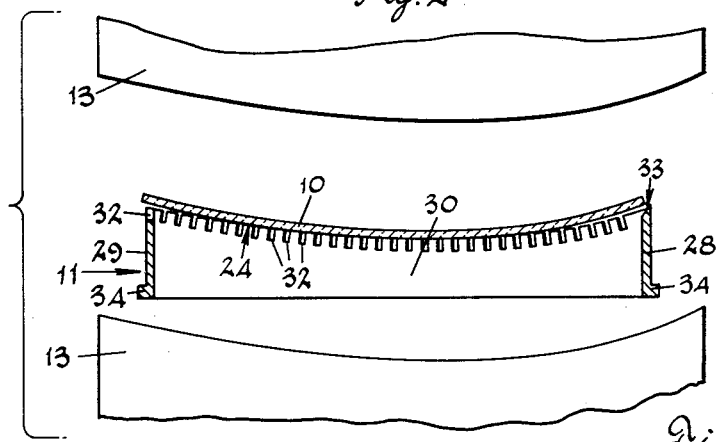
FIG. 3 is a fragmentary transverse sectional view showing the mold passing through the blast heads.

The rack 12 comprises side rails 14 and 15 formed to the general curvature of the mold 11 and supported by end members 16 and 17. The mold 11 is disposed within the rack 12 intermediate the side rails 14 and 15 and the end members 16 and 17 and is mounted on rods 18 spanning the side rails parallel to the end members with their opposite ends fixed to the side rails. The mold 11 is attached to the rods 18 through the medium of relatively short projections 20 formed on the rods and spaced apart therealong. In the illustrated mold, two such projections 20 are formed on each rod 18 to extend laterally therefrom and through ears 21 depending from the lower side of the mold 11 (FIGS. 1 and 2).

A solid ring-type bending mold such as illustrated in the drawings, generally, comprises an open framework 22 which in plan conforms substantially to the outline of the sheets to be bent. Shaping surfaces 24 conforming to the desired curvature of the glass sheets when the latter are bent into contact herewith are formed on the upper edge of the framework 22 to support the sheet in a generally horizontal position.

Sheet locating means 26 are provided adjacent the shaping surfaces 24 to engage the edges of the sheets 10 and thereby properly position the latter relative to the shaping surfaces. Herein, the sheet locating means 26 comprises upstanding bars 27 fixed to the framework 22 to project upwardly above the shaping surfaces 24 at three sides of the mold.

As the mold 11 is carried through a suitable heating chamber (not shown) by the rack 12, the sheet 10 sags downwardly against the shaping surface 24 and thereby assumes the desired curvature. While the glass sheet 10 is still at the elevated temperature required for bending, it is moved on the mold past the blast heads 13 which direct relatively cool air against the upper and lower surfaces of the glass to rapidly cool the latter.

As pointed out above, the marginal edges of the sheets which engage the shaping surface 24 cool at a slower rate than the rest of the sheet due to the residual heat of the mold and, therefore, are under tension or greatly reduced compression in the finished sheet. When one or more of the edges of the sheet are to be exposed in service use, such as when used as automobile side lights, the tensional or reduced compressional stresses in the exposed edges weaken the sheet making it more susceptible to destruction.

The present invention contemplates removing at least one edge of the sheets from the mold during the tempering process while at the same time supporting the sheets on the molds. This is accomplished in a novel manner to permit the use of a novel bending apparatus which, as compared to former devices of this type, is simpler in construction and easier to use. Broadly stated, the tempering process is performed in accordance with the present invention so that the sheet warps lifting at least one edge thereof off the shaping surface. In forming automobile side lights, of course, the exposed edge would be lifted off the shaping surface.

The direction in which the sheet 10 warps and the amount of warpage depends upon the differential in rate of cooling between the upper and lower surfaces of the sheets. The rate of cooling, in the present instance, is controlled or regulated in the desired manner by two factors; the construction of the mold 11 and the amount of air directed against the surface of the sheet by the blast heads 13.

As for the first factor, the construction of the mold 11, in accordance with one aspect of the invention, is such as to restrict the flow of air past the lower surface of the sheet. To this end, the framework 22 of the mold 11 is constructed of relatively thin plates disposed substantially vertically and arranged in a closed configuration conforming in outline to the sheets to be bent, and having side walls 28 and 29 and end walls 30 and 31 joined together at their adjacent ends to form a box-like construction. The shaping surfaces 24 are formed on the upper edges of the end and side walls whereby the latter form a chamber underlying the sheet supported on the mold 11 to trap the air flowing from the blast head 13. To add rigidity to the mold, an integral, outwardly projecting flange 134 is provided on the lower edges of the side walls.

In order that the chamber be of sufficient depth to materially reduce the flow of air past the lower edge of the sheet 10 and at the same time, in order to maintain the area of contact between the sheet and the mold at a minimum, the depth of the plates is much greater than the thickness of the plates. For example, in one mold which has been successfully used, the thickness of the plates is 3/16 inch and the width or depth is 2½ inches.

In order to reduce to some extent the amount of residual heat transferred from the mold to the edges of the glass sheet, the shaping surface 24 contacting at least three sides of the glass is notched as at 32. This reduces the area of contact between the glass sheet 10 and the mold 11 and, in addition, permits circulation of air past the lower surface of the glass. When bent and tempered on this type of shaping surface, the edges of the glass sheets have small areas of reduced compression wherever they contact the surface. In circulating past the lower edge of the sheet, the air enters the bottom of the chamber and passes outwardly through the notches 32 in the side walls and between the shaping surfaces 24 and the sheets 10.

In sagging into contact with the mold, the glass sheets 10 move relative to the shaping surface 24 of the mold 11 and this relative movement, while the glass is in a softened condition, results in mars being formed in the glass. These mars are not usually objectionable since they are confined to very small areas at the marginal edges of the sheets; edges which are generally hidden when the sheets are mounted. When one or more edges of a sheet are exposed, however, such mars would be very objectionable and, therefore, it is desirable that the area of contact between the mold and the exposed edges be maintained at a minimum. To this end the shaping surface engaging the exposed edges of the sheet are inclined upwardly and outwardly at an angle as at 33 shown in FIG. 4 whereby only the corner of the glass engages the shaping surface.

Figure 4:
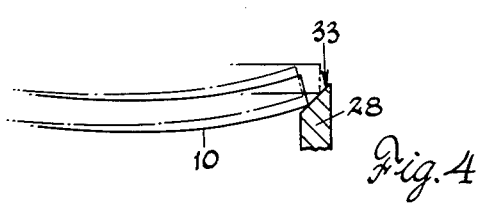
FIG. 4 is a fragmentary, enlarged view of the tempered edge of the mold shaping surface and showing the bent sheet supported on the surface; the initial and final position of the sheets being shown in phantom.

As for the second factor, in another of its aspects, the present invention contemplates controlling the amount of air directed from the blast heads 13 against the sheets 10 by maintaining a differential of pressure on opposite sides of the sheets adjacent the opposed blast heads. By controlling this differential in pressure in any well-known manner, the amount of warpage of the sheet is also controlled. In this respect, it is pointed out that as the sheet enters between the blast heads it is warped but slightly from the mold 11 as shown in FIG. 4. This permits a flow of cool air past the one edge of the sheet and between this edge and the inclined shaping surface 32 whereby the one edge may be properly tempered while, at the same time, the curvature may be held within acceptable limits.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

I claim:

1. In a method of bending and tempering glass sheets, the steps of, supporting a sheet to be bent on a shaping surface corresponding in outline and curvature to the sheet when bent, heating the sheet to a temperature corresponding to the softening point of the glass until said sheet sags into engagement with said shaping surface, and rapidly reducing the temperature of the opposite surfaces of the sheet at different rates thereby maintaining the uppermost surface at a lower temperature than the lowermost surface to cause warping of the sheet to move at least one edge of said sheet away from and out of contact with said shaping surface until said sheet is fully tempered.

2. A method of bending and tempering glass sheets as defined in claim 1, wherein said differential in cooling rates of the opposite surfaces of said sheet is effected by directing blasts of relatively cool air against the uppermost and lowermost surfaces of the bent sheet, and controlling the pressure of the air blasts against the opposite surfaces of the sheet whereby a greater amount of air is directed against the uppermost surface.

3. In a method of bending and tempering glass sheets as defined in claim 1, wherein said differential in cooling rates of the opposite surfaces of said sheet is effected by directing blasts of relatively cool air against the uppermost and lowermost surfaces of the bent sheet, and retarding the rate of flow of air adjacent the lowermost surface of the sheet.

4. A method of bending and tempering glass sheets as defined in claim 1, wherein certain edges of said sheet are supported on their respective shaping surfaces at a plurality of spaced points and said one edge of said sheet is supported along its entire length on a shaping surface inclined downwardly and inwardly thereby to maintain the area of contact between said one edge and the respective shaping surface at a minimum.

References Cited by the Examiner

UNITED STATES PATENTS

| | | | |
|---|---|---|---|
| 1,593,627 | 7/1926 | Gessner | 65—119 |
| 2,376,872 | 5/1945 | Harris | 65—119 |
| 2,470,245 | 5/1949 | Green | 65—115 |
| 2,518,951 | 8/1950 | Smith | 65—290 |
| 2,551,606 | 5/1951 | Jendrisak | 65—107 |
| 2,866,299 | 12/1958 | Long | 65—115 |
| 2,920,423 | 1/1960 | Carson et al. | 65—290 |
| 2,984,943 | 5/1961 | White | 65—268 X |
| 2,985,986 | 5/1961 | Leflet | 65—107 X |
| 3,008,272 | 11/1961 | Black et al. | 65—104 X |

DONALL H. SYLVESTER, *Primary Examiner.*

ARTHUR P. KENT, *Examiner.*

A. D. KELLOGG, *Assistant Examiner.*